Figure 1:
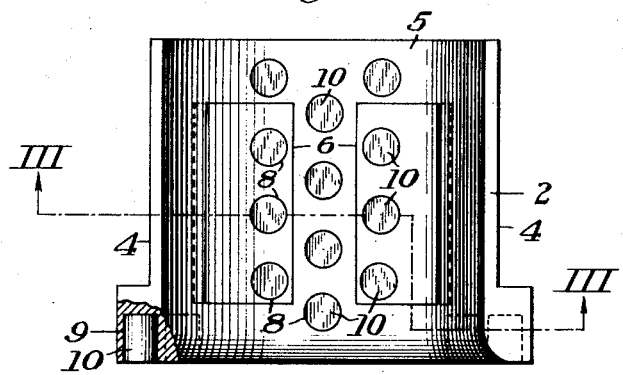

Jan. 19, 1926. 1,570,033

R. J. BANNER

BEARING OR BEARING LINER

Filed April 26, 1923

INVENTOR
Robert J. Banner

Patented Jan. 19, 1926.

1,570,033

UNITED STATES PATENT OFFICE.

ROBERT J. BANNER, OF YOUNGSTOWN, OHIO.

BEARING OR BEARING LINER.

Application filed April 26, 1923. Serial No. 634,729.

*To all whom it may concern:*

Be it known that I, ROBERT J. BANNER, a citizen of the United States, residing at Youngstown, county of Mahoning, and State of Ohio, have invented a new and useful Improvement in Bearings or Bearing Liners, of which the following is a full, clear, and exact description.

The present invention relates broadly to bearings, and more particularly to bearings or bearing liners adapted for heavy duty service, such as encountered in rolling mills, such as skelp mills and the like.

Bearings for this purpose have ordinarily been constructed with a brass body having one or more babbitt inserts. In actual use it has been found that as soon as the bearings become worn to a certain extent, they break through or crack. The present invention is directed particularly to a brass and babbitt bearing of this character having means increasing the length of life of the bearing, both by preventing rapid wearing thereof, and by preventing breaking or cracking.

In the accompanying drawings, there is shown for purposes of illustration only, a preferred embodiment of my invention, it being understood that the drawings do not define the limits of the invention, as changes may be made in the construction disclosed within the scope of my broader claims without departing from the spirit of the invention.

Figure 2:
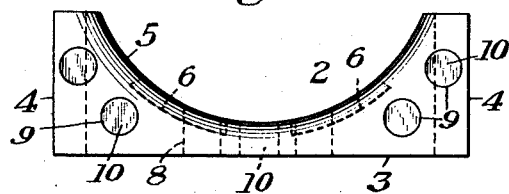
Figure 3:
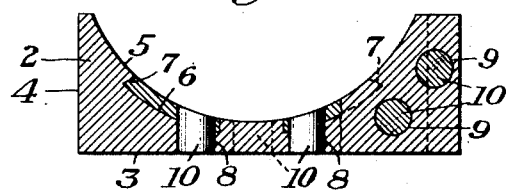

In the drawings:

Figure 1 is a top plan view, partly broken away, illustrating a bearing or bearing liner, Figure 2 is an end elevation of the construction illustrated in Figure 1, and Figure 3 is a transverse sectional view on the line III—III of Figure 1.

Whether the present invention is directed to a complete bearing, or to a liner for use in a bearing housing, it preferably comprises a body 2 of brass. This body is usually formed with a flat bottom or top 3, and with straight sides 4, the inner surface 5 being cast with a curvature such that it will accurately conform to the rotating surface to be supported therein.

During the formation of the brass body, which is usually accomplished by casting, cores are provided to form recesses 6 having at least one side or end 7 thereof undercut. Cores are also preferably provided for forming a series of vertically extending openings 8 and longitudinally extending openings 9. By providing the recesses 6 and the openings 9 during the formation of the bearing body, it is possible to save several pounds of brass in the making of each bearing. The recesses and openings may thereafter be machined as desired to provide surfaces of the required character.

When the openings are in proper condition, there may be forced thereinto a series of fine grained plugs of wood 10 having the grain thereof extending longitudinally of the plugs. In this manner the close grained end grain of the plugs is presented inwardly to constitute a portion of the wearing surface of the bearing. The plugs which are driven into the openings 9 are similarly constructed, thereby presenting their end grain outwardly to reinforce the thrust end of the bearing or liner.

Either after the plugs are in position, or before, the recesses 6 may be filled with suitable bearing material, such as babbitt, this material having been found highly suitable for this purpose. It is customary to form the recesses 6 on opposite sides of the center line of the bearing, in order not to materially decrease its strength at the center line, which is substantially the weakest point. In the present construction, in order to reinforce this center line, a row of the wooden plugs 10 is provided with their centers substantially coinciding with the center line. It has been found that in this manner the wooden plugs take up a considerable portion of the load, and strains transmitted to the bearing by reason of the rotation of the shaft, and due to certain inherent characteristics, not only increase the length of life of the bearing, but prevent it from cracking along the center line.

I am aware that it has heretofore been proposed to construct composite wood and metal bearings, and to provide bearings of different characters with inserts not only of lubricating material, but of wood, with the end grain constituting a portion of the wearing surface. So far as I am aware, however, it has never heretofore been proposed to provide a bearing of the present character with both babbitt and wooden inserts, as herein described.

The advantages of the present invention arise from the provision of a bearing of standard construction having means provided for increasing its durability and length of life.

I claim:

1. In a bearing, a brass body portion, babbitt inserts therein on opposite sides of the center line of said body portion, and a longitudinal row of wooden plugs extending through said body portion intermediate said babbitt inserts with their end grain constituting part of the wearing surface of the bearing, substantially as described.

2. In a bearing, a brass body portion, babbitt inserts therein on opposite sides of the center line of said body portion, a longitudinal row of wooden plugs extending through said body portion intermediate said babbitt inserts with their end grain constituting part of the wearing surface of the bearing, and additional plugs extending through said body and said babbitt inserts, substantially as described.

3. In a bearing, a brass body, a babbitt insert therein constituting part of the wearing surface, and fine grained wooden plugs extending through said body and said babbitt with their end grain terminating flush with and constituting part of the wearing surface of the bearing, substantially as described.

In testimony whereof I have hereunto set my hand.

ROBERT J. BANNER.